United States Patent [19]

Takezoe et al.

[11] 3,953,540

[45] Apr. 27, 1976

[54] ACRYLONITRILE-CHLORINATED POLYETHYLENE-STYRENE RESINOUS MOLDING COMPOSITIONS CONTAINING ANTIMONY TRIOXIDE

[75] Inventors: Shoichiro Takezoe, Chigasaki; Masao Ogawa, Tokyo; Junichi Nakamura, Yokohama, all of Japan

[73] Assignee: Showa Deuko Kabushiki Kaisha, Tokyo, Japan

[22] Filed: May 28, 1974

[21] Appl. No.: 473,582

[30] Foreign Application Priority Data
Aug. 24, 1973   Japan.............................. 48-94280

[52] U.S. Cl.............................. 260/878 R; 260/45; 260/75 R; 260/876 R; 260/881; 260/884; 260/885; 260/886; 260/897 B; 260/897 C; 260/DIG. 24

[51] Int. Cl.$^2$......................................... C08L 23/00
[58] Field of Search.......... 260/878 R, 881, DIG. 24

[56] References Cited
UNITED STATES PATENTS

| | | | |
|---|---|---|---|
| 3,494,982 | 2/1970 | Grabowski et al................. | 260/876 |
| 3,558,745 | 1/1971 | Ogawa et al........................ | 260/876 |
| 3,649,712 | 3/1972 | Grabowski.......................... | 260/873 |
| 3,673,279 | 6/1972 | Takahashi et al................ | 260/876 R |

*Primary Examiner*—Richard B. Turer
*Attorney, Agent, or Firm*—Sherman & Shalloway

[57] ABSTRACT

A resinous composition suitably used for molding purposes composed of an acrylonitrile-chlorinated polyethylene-styrene ternary resin and antimony trioxide and possessing high flame retardancy and superior antistatic properties.

10 Claims, No Drawings

ACRYLONITRILE-CHLORINATED POLYETHYLENE-STYRENE RESINOUS MOLDING COMPOSITIONS CONTAINING ANTIMONY TRIOXIDE

This invention relates to a resinous composition composed of an acrylonitrile-chlorinated polyethylene-styrene ternary resin and antimony trioxide, which composition not only possesses high flame retardancy and superior antistatic properties but also possesses satisfactory impact strength and moldability.

Lately, there is an increasing demand that synthetic resins be made flame retardant in order to ensure that articles made therefrom are safe from fires. Especially, in the case of electrical appliances for household use, the standards for passing the U.S. Underwriters' Laboratories' perpendicular combustion test have become much more strict. As a result, there is a strong demand for resins that possess high flame retardancy. Further, the soiling of the surface of molded articles as a result of a static charge is also considered to be one of the main causes of fires in recent years. Hence, the prevention of static charge has also become an important object. These defects of combustibility and static charge accumulation are to a certain extent inherent in the resins depending upon their class. While there have been previously proposed methods of improving upon the properties of the resins by adding various additives, all have had their advantages as well as disadvantages and none have been truly satisfactory.

Methods of flameproofing resins have been attempted for a long time. In the case of the flame retardant grade ABS resin (acrylonitrile-butadiene-styrene ternary resin) which has been much used in household electrical appliances, various agents for imparting flame retardancy to the resin have been proposed. For instance, it is known that flame, retardancy can be achieved by the conjoint use of either a low molecular weight halogen type agent, such as perchloropentacyclodecane and hexabromobenzene, or a high molecular weight halogen type agent, such as chlorinated paraffin and polyvinyl chloride, with an inorganic flame retardant assistant such as antimony trioxide. However, when the low molecular weight halogen type flame retardant agents are used, not only is there a decline in the properties of the resin (especially its impact strength), but also the use of such a flame retardant agent is undesirable since it increases a in the cost of the product. In recent years the toxicity of these halogen type flame retardant agents has also become a problem. Hence, the disadvantages of their use are even greater when the possibility of a restriction or prohibition of their use in the future is considered. Further, when the high molecular weight halogen type flame retardant agents such as chlorinated paraffin and polyvinyl chloride are used, thermal stability during the molding of the resin is extremely bad, with the consequence that this is a serious drawback in the case of the household electrical appliances in which thermal decomposition is of great importance. However, unless the foregoing halides are added, no improvement can be achieved at all by the mere addition of antimony trioxide, even in a large amount.

As methods of preventing static charge, there are known using a surfactant as an antistatic agent for internal use, i.e., as an admixing agent and, using a silicon compound as an antistatic agent for external use, i.e., as a coating material and an antistatic coating agent. While the object of preventing static charge can be achieved in the main by these methods, when an antistatic agent for internal use is used various problems arise, such as an irregularity of the antistatic effects due to poor compatibility, a decline in the antistatic effects with the passage of time, a decline in the properties of the resin (especially adhesiveness and coatability), the matter of toxicity, etc. In addition, the use of such an antistatic agent increases the cost of the product and thus is not desirable. When conjoint use of an antistatic agent for internal use is made with the flame retardant agent, there are drawbacks such as that not only a decline in the flame retardancy takes place, but also a further drop takes place in the aforementioned impact strength as well as the thermal stability during the molding of the resin. Thus, for the foregoing reasons, the flame retardant grade ABS resin incorporated with an antistatic agent is not being used very much. When an antistatic agent for external use is used, the agent either falls off or migrates into the interior as a result of abrasion or passage of time, with the consequence that the anti-static effect disappears.

As indicated above, the methods of imparting flame retardancy and the methods of preventing static charge that have been known previously, while having the ability to impart flame retardancy and antistatic effects, had the drawbacks of causing declines in the thermal properties, impact strength and moldability of the resins and hence were not able to impart at the same time all the properties that molding resins should desirably possess.

Accordingly, there is a strong demand for an engineering plastic, and especially a resinous composition having excellent properties for use in the manufacture of household electrical appliances.

Lately, the acrylonitrile-chlorinated polyethylenestyrene ternary resin (hereinafter to be abbreviated to ACS resin) is attracting much interest, because of the fact that due to the absence in the polymer of a double bond, it differs from the ABS resins in that it not only possesses excellent weatherability but also such excellent properties as superior impact strength, moldability and resistance to solvents. In addition, as is apparent from the nature of its chemical structure, it, being a composition containing a halogen, possesses flame retardancy. However, its flame retardancy is not of an order that can be considered to be truly satisfactory. Consequently, its field of use is restricted. If this drawback of the ACS resin could be solved, its much wider use could be expected.

Thus being the case, extensive research was conducted concerning methods of rendering the ACS resin flame retardant and antistatic. As a consequence, it was found that unexpected results were demonstrated when a specified amount of antimony trioxide was incorporated in an ACS resin of a specified composition. It was found that by doing this it was possible to obtain a resinous composition which not only is highly flame retardant in that it can pass the SE-O or SE-1 standards of the UL-94 perpendicular method combustion test, using a test piece of 1.6-mm thickness, but also excels at the same time in its antistatic property, as well as processing a satisfactory impact strength and good moldability. The present invention was thus perfected.

It is therefore an object of this invention to provide an ACS resinous composition which not only possesses high flame retardancy as well as excels in its antistatic property but also possesses the various properties that makes for its satisfactory use as a molding resin.

Another object of the invention is to provide an excellent material for use in the manufacture of building materials, vehicles and electrical appliances, especially a material suitably used for the manufacture of household electrical appliances, for example, a material suitable for making the covers and cases of desk-model electronic calculators, microwave ovens, radios, television sets, electric refrigerators, washers, etc.

The flame retardant effects obtained in this invention by the addition of antimony trioxide are exceedingly marked. While the particulars of the mechanism involved are not yet clear, it is hypothesized as follows: When the chlorinated polyethylene component contained in the ACS resin thermally decomposes, it is presumed that hydrogen chloride is generated, which then immediately reacts with the antimony trioxide to form antimony trichloride gas and steam, with the consequence that the ignition and combustion is hindered by the endothermic action of the heat of vaporization and the shutoff oxygen by the heavy noncombustible antimony trichloride gas generation that takes place at this time. On the other handd, the particulars as to why an excellent antistatic effect is manifested are not known at all. This is a peculiar phenomenon which takes place in a conspicuous manner when antimony trioxide is added to an ACS resin containing 25 – 35% by weight of a chlorinated polyethylene of a degree of chlorination of 30 – 45% by weight obtained by chlorinating commercially available polyethylene. Even though antimony trioxide is added to the ABS resins, similar effects are not observed and, again, even though antimony trioxide is add to the ACS resins in which the degree of chlorination and the content of the chlorinated polyethylene is without the foregoing ranges, conspicuous effects are not manifested.

Another conspicuous feature of this invention is the fact that a resinous composition of exceedingly good thermal stability is obtained. That is, amazing results are obtained in that by the addition of antimony trioxide in a specified amount to the ACS resin, which primarily possesses good thermal stability, a still greater improvement is had in the thermal stability of this resin. In the first place, the reason why the thermal stability of the ACS resin is good in spite of the fact it is a chlorine-containing high molecular weight substance is believed to be due to the fact that the chlorine atom is nonuniformly bonded in the molecular structure of the chlorinated polyethylene, with the consequence that a linked removal of hydrochloric acid does not take place as in the case of polyvinyl chloride. Thus, when antimony trioxide is added, the thermal stability shows a further improvement. An effect such as this is a unique phenomenon not seen in the case of polyvinyl chloride.

Another feature of this invention is that there is no decline in the excellent properties, i.e., the impact strength, tensile strength, moldability and heat distortion temperature, that are inherently possessed by the ACS resins, even though antimony trioxide in a specified amount is incorporated therein. Especially in the case of the heat distortion temperature, the addition of the antimony trioxide results in a further improvement of this property. This is believed to be due to the fact that the ACS resins and antimony trioxide are especially compatible.

The ACS resins include (a) the so-called graft type ACS resin which is obtained by copolymerizing a chlorinated polyethylene with a mixture of acrylonitrile and styrene; (b) the so-called blend type ACS resin which is obtained by mixing a chlorinated polyethylene with an acrylonitrilestyrene copolymer; and (c) the so-called graft-blend type ACS resin which is obtained by mixing the foregoing graft type ACS resin with an acrylonitrile-styrene copolymer. Also included as ACS resins are those in which methyl methacrylate is substituted for a part of the foregoing acrylonitrile and those in which alpha-methylstyrene is substituted for a part of the styrene. Included among the foregoing chlorinated polyethylenes are chlorinated polyethylene obtained by chlorinating a polyethylene of an average molecular weight of above 50,000, and preferably above 100,000 and, in addition, those obtained by chlorinating ethylene copolymers such as ethylenepropylene or ethylenebutene-1, and that obtained by chlorosulfonating polyethylene.

The ACS resin used in the present invention may be any of the foregoing types of ACS resins. It is however important that they contain the chlorinated polyethylene in an amount of 25 – 35% by weight and that the degree of chlorination of said chlorinated polyethylene is 30 – 45% by weight. The ratio of acrylonitrile to styrene is preferably in the range of 1 : 99 to 50 : 50. A degree of chlorination of less than 30% by weight is not desirable, since difficulty is experienced in achieving a high degree of flame retardancy and, moreover, the antistatic effects are also not adequate. On the other hand, a degree of chlorination exceeding 45% by weight is also not to be desired, because a decline takes place in the impact strength of the ACS resin. When the content in the ACS resin of the chlorinated polyethylene is less than 25% by weight, adequate impact strength cannot be hoped for. In addition, there is a decline in the antistatic and flame retardant properties. On the other hand, when the amount used of the chlorinated polyethylene exceeds 35% by weight, this likewise is not desirable, since the tensile strength and moldability of the resulting resin suffer.

Antimony trioxide, the additive used in this invention, is used in an amount of 8 – 20 parts by weight per 100 parts by weight of the ACS resin. Various compounds are commonly known as being effectively used as flame retardant agents of resins, but in this invention antimony trioxide was found to be most conspicuous in its effects. When the antimony trioxide is used in an amount of less than 8 parts by weight, the flame retardant and thermal stability effects are small. On the other hand, when its use exceeds 20 parts by weight, there is naturally an improvement in the flame retardancy but not only is it exceedingly difficult to maintain the superior impact strength of the resin, but also the cost increases.

In preparing the resinous composition of this invention, the aforementioned ACS resin and antimony trioxide can be mixed with the usual methods, using such means as mixing rolls, a kneader, a Banbury mixer, an extruder, etc. In this case conventional stabilizers such as lead, tin and other metallic soap may be added, as required.

The following examples are given for more specifically illustrating the invention. In the examples the physical properties of the molded samples were determined in the following manner.

Flame retardancy.

The flame retardancy was determined by the UL-94 perpendicular method combustion test using a test piece 1.6 mm thick.

Antistatic property a. Dust chamber test.

The sample was forcedly sprayed with powdered carbon, following which the sample was left to stand for 24 hours in a 20°C. constant temperature chamber. The extent of carbon adhesion was then examined. The instance where the amount adhered was the most was awarded the value 10, while the instance where the amount adhered was the least was awarded the value 0, the intermediate ratings 9–1 being then inserted suitably between these two values.

Antistatic property b. Static honest meter test.

The sample was forcedly electrified for 6 seconds with 10 KV. Twenty minutes later, the charge retained (%) was measured and used to indicate the antistatic property.

Tensile strength.

The tensile strength was measured in accordance with ASTM Method D 638.

Impact strength.

The impact strength was measured in accordance with ASTM Method D 256-56.

Moldability (flow).

The moldability was measured with a Koka type flow tester, the measurement being made at 220°C. under a load condition of 100 Kg with nozzle 1.0 millimeter in diameter and 10 millimeters in length.

Thermal stability.

The sample was left standing for 30 minutes at 220°C. in a nitrogen atmosphere, and the degree of discoloration was then observed with the naked eye. The instance where the discoloration was greatest was awarded the value 5, while the instance where no discoloration was observed was awarded the value 0, the intermediate ratings 4–1 being then inserted suitably between these two values.

Examples

Antimony trioxide was admixed with the several classes of ACS resins in an amount, on a weight basis, in the amounts indicated in Table 1, per 100 parts by weight of the resin. To 400 grams of the resulting mixture was then added 8 grams of dibutyltin maleate as stabilizer, following which the mixture was kneaded for 5 minutes with 8-inch heated rolls held at about 160°C. to obtain the resinous compositions. The control experiments were carried out in like manner.

The so obtained resinous compositions were then compression molded at a temperature of 190°C. and a pressure of 150 $Kg/cm^2$, thus preparing the several test pieces, which were measured for their physical properties in accordance with the above - described methods of measurement. The results obtained are shown in Table 1.

The resin components used in these experiments were as follows:

ACS resin (I): A graft copolymer obtained by copolymerizing an acrylonitrile-styrene monomer mixture containing 25% by weight of acrylonitrile, in the presence of chlorinated polyethylenes of various degrees of chlorination (weight average molecular weight of starting polyethylene=300,000).

ACS resin (II): A blend of an acrylonitrile-styrene copolymer containing 25% by weight of acrylonitrile and an ACS resin containing 65% by weight of a chlorinated polyethylene obtained by copolymerizing an acrylonitrile-styrene monomer mixture containing 25% by weight of acrylonitrile, in the presence of a chlorinated polyethylene of a degree of chlorination of 40 weight % (weight average molecular weight of starting polyethylene=300,000). The content of the chlorinated polyethylene of this blend is 30% by weight.

ACS resin (III): A blend of a chlorinated polyethylene of degree of chlorination of 40 weight % (weight average molecular weight of a starting polyethylene = 300,000) and an acrylonitrile-styrene copolymer containing 25% by weight of acrylonitrile. The chlorinated polyethylene content of the blend is 30% by weight.

ABS resin (I): Twenty parts by weight of antimony trioxide added to 100 parts by weight of CYCOLAC GSM (a commercial ABS resin).

ABS resin (II): Fifteen parts by weight of hexabromobenzene and 8 parts by weight of antimony trioxide added to 100 parts by weight of CYCOLAC GSM.

ABS resin (III): Two parts by weight of an anioncation type antistatic agent (zinc N-methylstearyldithiocarbamate) added further to the ABS resin (II).

Table 1

| | Resin | Chlorinated polyethylene Degree of chlorination (%) | Content (%) | Antimony trioxide (wt.parts) | Flame retardancy UL-94 | Antistatic property (a) | (b) | Tensile strength $Kg/cm^2$ | Impact strength Kg-cm/cm | Flow fcc/scc | Thermal stability |
|---|---|---|---|---|---|---|---|---|---|---|---|
| Control 1 | ABS (I)* | — | — | — | SB** | 10 | 56.0 | 370 | 4.3 | 4.0 | 1 |
| 2 | ABS (II)* | — | — | — | SE-1*** | 9 | 49.1 | 360 | 5.4 | 3.5 | 1 |
| 3 | ABS (III)* | — | — | — | SB | 0 | 15.2 | 360 | 4.8 | 3.6 | 1 |
| Example 1 | ACS (I) | 30 | 30 | 18 | SE-1 | 0 | 16.2 | 350 | 15.5 | 14.1 | 1 |
| 2 | ACS (I) | 40 | 25 | 15 | SE-1 | 0 | 17.7 | 370 | 10.7 | 18.0 | 1 |
| 3 | ACS (I) | 40 | 30 | 15 | SE-0 | 0 | 17.0 | 350 | 13.4 | 14.1 | 1 |
| 4 | ACS (I) | 40 | 35 | 15 | SE-0 | 0 | 15.0 | 330 | 17.2 | 12.2 | 1 |
| 5 | ACS (I) | 40 | 35 | 10 | SE-0 | 0 | 15.0 | 340 | 18.8 | 12.8 | 1 |
| 6 | ACS (II) | 40 | 30 | 15 | SE-0 | 0 | 16.5 | 350 | 13.4 | 14.2 | 1 |
| 7 | ACS (III) | 40 | 30 | 15 | SE-0 | 0 | 16.6 | 355 | 11.8 | 14.1 | 1 |
| Control 4 | ACS (I) | 25 | 30 | 15 | SB | 5 | 25.5 | 330 | 12.9 | 14.3 | 1 |
| 5 | ACS (I) | 50 | 30 | 15 | SE-0 | 0 | 16.8 | 350 | 4.8 | 14.0 | 2 |
| 6 | ACS (I) | 40 | 20 | 15 | SB | 5 | 30.1 | 380 | 6.4 | 19.5 | 1 |
| 7 | ACS (I) | 40 | 40 | 15 | SE-0 | 0 | 14.4 | 250 | 18.8 | 9.2 | 1 |

Table 1 — Continued

| Resin | Chlorinated polyethylene Degree of chlorination (%) | Chlorinated polyethylene Content (%) | Antimony trioxide (wt.parts) | Flame retardancy UL-94 | Antistatic property (a) | Antistatic property (b) | Tensile strength Kg/cm$^2$ | Impact strength Kg-cm/cm | Flow fcc/scc | Thermal stability |
|---|---|---|---|---|---|---|---|---|---|---|
| 8 ACS (I) | 40 | 30 | 5 | SB | 1 | 18.5 | 355 | 14.5 | 15.0 | 2 |
| 9 ACS (I) | 40 | 30 | 25 | SE-0 | 0 | 16.0 | 330 | 4.8 | 14.0 | 1 |

*See preceding description
**Slow Burning
***Self Extinguishing

It can be seen from Table 1 that the resinous compositions of the present invention exhibit a high degree of flame retardancy corresponding to the SE-0 or SE-1 rating as determined by the UL-94 perpendicular method combustion test, a most rigorous flame retardancy standard. Further, it is seen that the antistatic property of the invention resinous composition compares favorably with the antistatic grade commercial ABS resins. In addition, it is seen that the invention resinous compositions excel in impact strength and other properties, and the high flow rates indicate that they possess good moldability.

These points will be more fully explained below.

1. Control 1 is the case where antimony trioxide has been added to the ABS resin. In this case the flame retardancy is not improved at all and, moreover, there is an marked decline in the impact strength, with the consequence that the excellent properties possessed inherently by the ABS resin are lost. Again, the antistatic property was poor, there existing a great difference from that of the invention resinous compositions.

2. Control 2 is the case of a typical flame retardant grade ABS resin. In this case the flame retardancy is achieved by the conjoint use of hexabromobenzene and antimony trioxide. While the flame retardancy has been improved in this case, this resin is more expensive than the ordinary grade ABS resin, because a large amount of the expensive hexabromobenzene has been added. Since the amount added of anitmony trioxide (usually less than 10% by weight) is small, the impact strength has not declined as much as in the case of Control 1, but it is nevertheless considerably low. Again, as regards the improvement in the antistatic property, there was also a great difference from that of the invention resinous compositions.

3. Control 3 is the case where 2 parts by weight of an antistatic agent way added to the flame retardant grade ABS resin of Control 2, with the consequence that the object of achieving antistatic effects was realized, but there was the drawback that the flame retardancy suffers. It can thus be seen how difficult a matter it is to obtain a resinous composition which not only excels in antistatic property but also is satisfactory as to its flame retardancy.

4. Examples 1–7 are cases where a specified amount of antimony trioxide was added to ACS resins containing the chlorinated polyethylene component in a specified proportion. In all cases the resulting products have a high degree of flame retardancy and excel in their antistatic property. Further, the products possess superior impact strength in all cases though varying somewhat depending upon their content of the chlorinated polyethylene. And especially, it is seen that the products possess high impact strengths notwithstanding the addition of the antimony trioxide in large amounts.

Again, their flow property being higher than that of the ABS resins of the control experiments, it can be seen that they can be molded with ease. That is to say, the resinous composition of the present invention not only possesses a high degree of flame retardancy and excellent antistatic property but also possesses excellent physical properties, especially superior impact strength and flow property, and is thus a well-balanced resinous composition.

5. Controls 4 and 5 illustrate instances in which the degree of chlorination of the chlorinated polyethylene contained in the ACS resin is outside the range specified by this invention. When the degree of chlorination is lower than specified by this invention, not only is the flame retardancy not improved, but also the antistatic property is inadequate. On the other hand, when the degree of chlorination is too high, there is a great decline in impact strength, though the object of achieving flame retardancy and antistatic property is realized. Hence, this becomes a problem from the standpoint of making practical use of the resin.

6. Controls 6 and 7 are instances in which the content of the chlorinated polyethylene in the ACS resin is outside the range specified by this invention. When the content of the chlorinated polyethylene is less than that specified, neither the flame retardancy is improved nor is the antistatic property adequate. Again, the impact strength also declines. On the other hand, when the content of the chlorinated polyethylene is too great, there is a marked decline in the tensile strength, though improvements are had in the flame retardancy and antistatic property. Hence, the product becomes unsuitable for use as an engineering plastic.

7. Controls 8 and 9 illustrate instances where the amount added of the antimony trioxide is outside the range specified by the present invention. When the amount added of the antimony trioxide is less than that specified, the intended flame retardancy level is not attained, i.e., the SE-1 or SE-0 rating of the combustion test in accordance with the UL perpendicular method is not achieved as originally expected. On the other hand, when the amount added of the antimony trioxide is too great, a marked decline takes place in the impact strength, though the flame retardancy and antistatic property are improved. Hence, this becomes a problem from the standpoint of making practical use of the resin.

We claim:

1. A flame retardant, antistatic, high impact strength resinous molding composition consisting essentially of
   A. from 8 to 20 parts by weight of antimony trioxide, and
   B. 100 parts by weight of an acrylonitrile-chlorinated polyethylene-styrene ternary resin containing from 25 to 35% by weight of a chlorinated polyethylene having a degree of chlorination of from 30 to 45% by weight obtained by copolymerizing a chlorinated polyethylene, obtained by chlorinating a polyethylene having an average molecular weight of about 50,000, with a mixture of acrylonitrile and styrene to form a graft resin, the ratio of acrylonitrile to styrene being in the range of from 1:99 to 50:50.

2. The resin of claim 1, in which the average molecular weight is above 100,000.

3. The resin of claim 2, in which the average molecular weight is 300,000.

4. The resin of claim 1, in which the chlorinated polyethylene is obtained by chlorinating an ethylene copolymer.

5. The resin of claim 1, in which the chlorinated polyethylene is obtained by chlorosulfonating polyethylene.

6. The resin of claim 1, in which the antimony trioxide is present in from 10 to 18 parts by weight.

7. The resin of claim 6, in which the antimony trioxide is present in about 15 parts by weight.

8. The resin of claim 1, in which the acrylonitrile is present in 25% by weight.

9. The resin of claim 1, in which the content of the chlorinated polyethylene is 30% by weight.

10. The resin of claim 1, in which the degree of chlorination is 40% by weight.

* * * * *

UNITED STATES PATENT AND TRADEMARK OFFICE
CERTIFICATE OF CORRECTION

PATENT NO. : 3,953,540
DATED : April 27, 1976
INVENTOR(S) : TAKEZOE, ET AL.

It is certified that error appears in the above-identified patent and that said Letters Patent are hereby corrected as shown below:

Item 73, line 1, delete "Deuko", insert -- Denko --

Claim 1, line 12, delete "about", insert -- above --

Signed and Sealed this

Twentieth Day of July 1976

[SEAL]

Attest:

RUTH C. MASON
*Attesting Officer*

C. MARSHALL DANN
*Commissioner of Patents and Trademarks*